United States Patent [19]

Peterson et al.

[11] Patent Number: 5,729,671
[45] Date of Patent: Mar. 17, 1998

[54] OBJECT-ORIENTED METHOD AND APPARATUS FOR RENDERING A 3D SURFACE IMAGE ON A TWO-DIMENSIONAL DISPLAY

[75] Inventors: John Peterson, Menlo Park; Rajiv Jain, Sunnyvale, both of Calif.

[73] Assignee: Object Technology Licensing Corp., Cupertino, Calif.

[21] Appl. No.: 612,675

[22] Filed: Mar. 8, 1996

Related U.S. Application Data

[63] Continuation of Ser. No. 97,602, Jul. 27, 1993, abandoned.

[51] Int. Cl.$^6$ .................... G06T 11/20; G06T 17/00
[52] U.S. Cl. .................... 395/123; 395/133; 395/522
[58] Field of Search .................. 395/162, 121, 395/123, 133, 134, 522

[56] References Cited

U.S. PATENT DOCUMENTS

| | | | |
|---|---|---|---|
| 4,821,220 | 4/1989 | Duisberg | 364/578 |
| 4,885,717 | 12/1989 | Beck et al. | 364/900 |
| 4,891,630 | 1/1990 | Friedman et al. | 340/706 |
| 4,912,659 | 3/1990 | Liang | 395/123 X |
| 4,930,092 | 5/1990 | Reilly | 395/123 |
| 4,953,080 | 8/1990 | Dysart et al. | 364/200 |
| 5,041,992 | 8/1991 | Cunningham et al. | 364/518 |
| 5,050,090 | 9/1991 | Golub et al. | 364/478 |
| 5,060,276 | 10/1991 | Morris et al. | 382/8 |
| 5,075,848 | 12/1991 | Lai et al. | 395/425 |
| 5,093,914 | 3/1992 | Coplien et al. | 395/700 |
| 5,119,475 | 6/1992 | Smith et al. | 395/156 |
| 5,125,091 | 6/1992 | Staas, Jr. et al. | 395/650 |
| 5,133,075 | 7/1992 | Risch | 395/800 |
| 5,136,705 | 8/1992 | Stubbs et al. | 395/575 |
| 5,151,987 | 9/1992 | Abraham et al. | 395/575 |
| 5,181,162 | 1/1993 | Smith et al. | 364/419 |
| 5,222,202 | 6/1993 | Koyamada | 395/123 |
| 5,278,948 | 1/1994 | Luken, Jr. | 395/123 |
| 5,394,523 | 2/1995 | Harris | 395/162 |
| 5,471,568 | 11/1995 | Webb et al. | 395/133 |

OTHER PUBLICATIONS

Proceedings Visualization, Oct. 19, 1992, Los Alamitos, CA, US, pp. 219–226, Schroder, "Visage: An Object–Oriented Scientific Visualization System".

*Primary Examiner*—Mark K. Zimmerman
*Attorney, Agent, or Firm*—Bookstein & Kudirka

[57] ABSTRACT

A method and system provides an object-oriented framework for rendering three-dimensional surfaces on a two-dimensional display in a flexible manner. The framework comprises two main classes that work together to render discretized data points that represent the three-dimensional graphic objects. The first class is used to construct a surface object which has a first member function that generates vertex information for each of the data points and stores the vertex information in a memory. The surface object also contains a second member function which generates indices into the stored vertex information which indices define shards on the surface which is being rendered. The second class is used to construct a rendering object which calls the first and second member functions in the surface object to first process the vertex data for display and then use the shard indices to retrieve the processed vertex data to render the surface. Vertex data processing is separated from shard processing to increase the efficiency of the rendering process.

21 Claims, 6 Drawing Sheets

OBJECT-ORIENTED METHOD AND APPARATUS FOR RENDERING A 3D SURFACE IMAGE ON A TWO-DIMENSIONAL DISPLAY

This is a continuation of application Ser. No. 08/097,602 filed on Jul. 27, 1993 now abandoned.

COPYRIGHT NOTIFICATION

Portions of this patent application contain materials that are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention generally relates to improvements in computer systems and more particularly to a system and method for rendering surfaces on a graphic display.

BACKGROUND OF THE INVENTION

Graphic processing of surfaces is a critical problem for presenting information in an aesthetic, ergonomic manner. Thus, modern graphic systems, which utilize information-handling systems that are designed to process a wide variety of information, including text and graphic information, are becoming increasingly sophisticated so as to process this information in a more ergonomic manner.

Prior software operating system architectures are limited in their surface rendering capability. A limitation is that the operating system architecture may not be able to support a given peripheral device for which the architecture was not designed or could not be modified to support. Also, a prior architecture may only process surface rendered information in a single, pre-defined manner.

SUMMARY OF THE INVENTION

Accordingly, it is a primary objective of the present invention to process graphic objects on a computer with a memory and an attached display in a flexible manner. The objective is accomplished by loading the graphic object into a memory and rendering the graphic object based on the processing of vertex data in a modular manner separated from edge and triangle data (shards) to increase the efficiency of the rendering process.

The method and system include capability for processing graphic objects on a computer with a memory and an attached display. The processing commences by receiving a plurality of vertices into memory and storing them. Then, triangles are generated for a surface based on the plurality of vertices. Finally, a surface is rendered using the triangles to form the surface on the attached display.

DETAILED DESCRIPTION OF THE INVENTION

Figure 1:
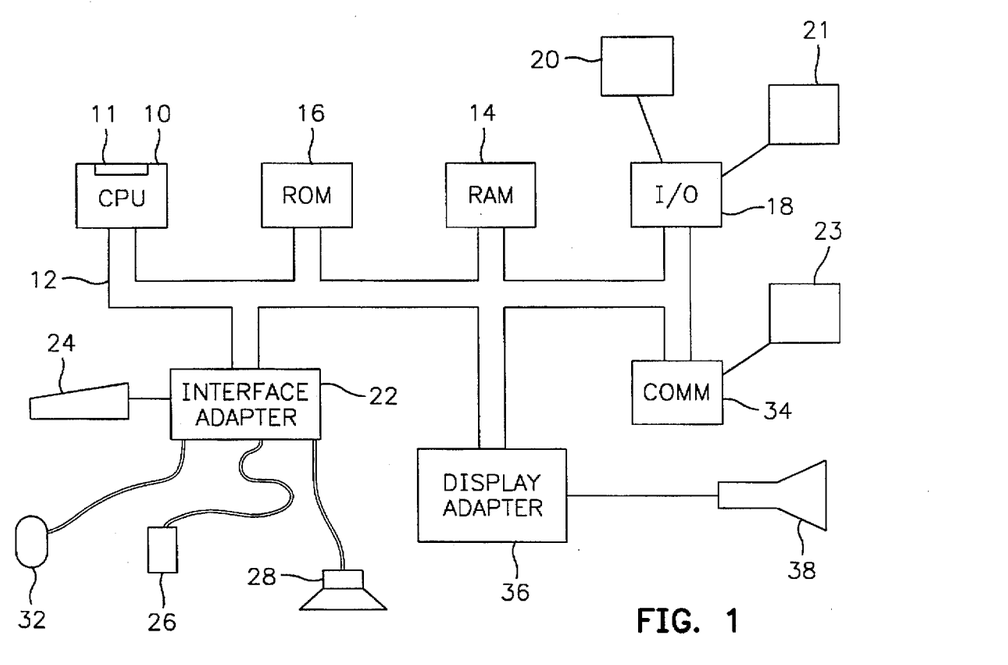
FIG. 1 is a block diagram of a personal computer system in accordance with a preferred embodiment.

The invention is preferably practiced in the context of an operating system resident on a personal computer such as the IBM® PS/2® or Apple® Macintosh® computer. A representative hardware environment is depicted in FIG. 1, which illustrates a typical hardware configuration of a computer in accordance with the subject invention having a central processing unit 10, such as a conventional microprocessor, with a built in non-volatile storage 11, and a number of other units interconnected via a system bus 12. The workstation shown in FIG. 1 includes a Random Access Memory (RAM) 14, Read Only Memory (ROM) 16, an I/O adapter 18 for connecting peripheral devices such as a disk unit 20, and a diskette unit 21 to the bus, a user interface adapter 22 for connecting a keyboard 24, a mouse 26, a speaker 28, a microphone 32, and/or other user interface devices such as a touch screen device (not shown) to the bus, a communication adapter 34 for connecting the workstation to a data processing network 23 and a display adapter 36 for connecting the bus to a display device 38. The computer has resident thereon an operating system such as the Apple System/7® operating system.

In a preferred embodiment, the invention is implemented in the C++ programming language using object oriented programming techniques. As will be understood by those skilled in the art, Object-Oriented Programming (OOP) objects are software entities comprising data structures and operations on the data. Together, these elements enable objects to model virtually any real-world entity in terms of its characteristics, represented by its data elements, and its behavior, represented by its data manipulation functions. In this way, objects can model concrete things like people and computers, and they can model abstract concepts like numbers or geometrical concepts. The benefits of object technology arise out of three basic principles: encapsulation, polymorphism and inheritance.

Objects hide, or encapsulate, the internal structure of their data and the algorithms by which their functions work. Instead of exposing these implementation details, objects present interfaces that represent their abstractions cleanly with no extraneous information. Polymorphism takes encapsulation a step further. The idea is many shapes, one interface. A software component can make a request of another component without knowing exactly what that component is. The component that receives the request interprets it and figures out according to its variables and data, how to execute the request. The third principle is inheritance, which allows developers to reuse pre-existing design and code. This capability allows developers to avoid creating software from scratch. Rather, through inheritance, developers derive subclasses that inherit behaviors, which the developer then customizes to meet their particular needs.

A prior art approach is to layer objects and class libraries in a procedural environment. Many application frameworks on the market take this design approach. In this design, there are one or more object layers on top of a monolithic operating system. While this approach utilizes all the principles of encapsulation, polymorphism, and inheritance in the object layer, and is a substantial improvement over procedural programming techniques, there are limitations to this approach. These difficulties arise from the fact that while it is easy for a developer to reuse their own objects, it is difficult to use objects from other systems and the developer still needs to reach into the lower non-object layers with procedural Operating System (OS) calls.

Another aspect of object oriented programming is a framework approach to application development. One of the most rational definitions of frameworks come from Ralph E. Johnson of the University of Illinois and Vincent F. Russo of Purdue. In their 1991 paper, Reusing Object-Oriented Designs, University of Illinois tech report UIUCDCS91-1696 they offer the following definition: "An abstract class is a design of a set of objects that collaborate to carry out a set of responsibilities. Thus, a framework is a set of object classes that collaborate to execute defined sets of computing responsibilities." From a programming standpoint, frameworks are essentially groups of interconnected object classes that provide a pre-fabricated structure of a working application. For example, a user interface framework might provide the support and "default" behavior of drawing windows, scrollbars, menus, etc. Since frameworks are based on object technology, this behavior can be inherited and overridden to allow developers to extend the framework and create customized solutions in a particular area of expertise. This is a major advantage over traditional programming since the programmer is not changing the original code, but rather extending the software. In addition, developers are not blindly working through layers of code because the framework provides architectural guidance and modeling but at the same time frees them to then supply the specific actions unique to the problem domain.

From a business perspective, frameworks can be viewed as a way to encapsulate or embody expertise in a particular knowledge area. Corporate development organizations, Independent Software Vendors (ISV)s and systems integrators have acquired expertise in particular areas, such as manufacturing, accounting, or currency transactions as in our example earlier. This expertise is embodied in their code. Frameworks allow organizations to capture and package the common characteristics of that expertise by embodying it in the organization's code. First, this allows developers to create or extend an application that utilizes the expertise, thus the problem gets solved once and the business rules and design are enforced and used consistently. Also, frameworks and the embodied expertise behind the frameworks have a strategic asset implication for those organizations who have acquired expertise in vertical markets such as manufacturing, accounting, or bio-technology would have a distribution mechanism for packaging, reselling, and deploying their expertise, and furthering the progress and dissemination of technology.

Historically, frameworks have only recently emerged as a mainstream concept on personal computing platforms. This migration has been assisted by the availability of object-oriented languages, such as C++. Traditionally, C++ was found mostly on UNIX systems and researcher's workstations, rather than on Personal Computers in commercial settings. It is languages such as C++ and other object-oriented languages, such as Smalltalk and others, that enabled a number of university and research projects to produce the precursors to today's commercial frameworks and class libraries. Some examples of these are InterViews from Stanford University, the Andrew toolkit from Carnegie-Mellon University and University of Zurich's ET++ framework.

There are many kinds of frameworks depending on the level of the system and the nature of the problem. The types of frameworks range from application frameworks that assist in developing the user interface, to lower level frameworks that provide basic system software services such as communications, printing, file systems support, graphics, etc. Commercial examples of application frameworks are MacApp (Apple), Bedrock (Symantec), OWL (Borland), NeXTStep App Kit (NeXT), and Smalltalk-80 MVC (ParcPlace) to name a few.

Programming with frameworks requires a new way of thinking for developers accustomed to other kinds of systems. In fact, it is not like "programming" at all in the traditional sense. In old-style operating systems such as DOS or UNIX, the developer's own program provides all of the structure. The operating system provides services through system calls—the developer's program makes the calls when it needs the service and control returns when the service has been provided. The program structure is based on the flow-of-control, which is embodied in the code the developer writes.

When frameworks are used, this is reversed. The developer is no longer responsible for the flow-of-control. The developer must forego the tendency to understand programming tasks in term of flow of execution. Rather, the thinking must be in terms of the responsibilities of the objects, which must rely on the flamework to determine when the tasks should execute. Routines written by the developer are activated by code the developer did not write and that the developer never even sees. This flip-flop in control flow can be a significant psychological barrier for developers experienced only in procedural programming. Once this is understood, however, framework programming requires much less work than other types of programming.

In the same way that an application framework provides the developer with prefab functionality, system frameworks, such as those included in a preferred embodiment, leverage the same concept by providing system level services, which developers, such as system programmers, use to subclass/override to create customized solutions. For example, consider a multi-media framework which could provide the foundation for supporting new and diverse devices such as audio, video, MIDI, animation, etc. The developer that needed to support a new kind of device would have to write a device driver. To do this with a framework, the developer only needs to supply the characteristics and behavior that is specific to that new device.

The developer in this case supplies an implementation for certain member functions that will be called by the multi-media framework. An immediate benefit to the developer is that the generic code needed for each category of device is already provided by the multi-media framework. This means less code for the device driver developer to write, test, and debug. Another example of using system framework would be to have separate I/O frameworks for SCSI devices, NuBus cards, and graphics devices. Because there is inherited functionality, each framework provides support for common functionality found in its device category. Other developers could then depend on these consistent interfaces to all kinds of devices.

A preferred embodiment takes the concept of frameworks and applies it throughout the entire system. For the commercial or corporate developer, system integrator, or OEM, this means all the advantages that have been illustrated for a framework such as MacApp can be leveraged not only at the application level for such things as text and user interfaces, but also at the system level, for services such as graphics, multi-media, file systems, I/O, testing, etc.

Application creation in the architecture of a preferred embodiment is essentially be like writing domain-specific puzzle pieces that adhere to the flamework protocol. In this manner, the whole concept of programming changes. Instead of writing line after line of code that calls multiple API hierarchies, software will be developed by deriving classes from the preexisting frameworks within this environment, and then adding new behavior and/or overriding inherited behavior as desired.

Thus, the developer's application becomes the collection of code that is written and shared with all the other flamework applications. This is a powerful concept because developers will be able to build on each other's work. This also provides the developer the flexibility to customize as much or as little as needed. Some frameworks will be used just as they are. In some cases, the amount of customization will be minimal, so the puzzle piece the developer plugs in will be small. In other cases, the developer may make very extensive modifications and create something completely new. In a preferred embodiment, as shown in FIG. 1, a program resident in the RAM 14, and under the control of the CPU 10, is responsible for managing various tasks using an object oriented graphic framework.

A preferred embodiment employs a new architecture to store three dimensional (3D) data defining graphic objects such as fractal surfaces, data digitized or scanned from real world sources, reconstructions such as volumetric CAT scans, and shapes approximated from other computations (e.g., fluid flow). In a preferred embodiment, these types of datasets are referred to as discretized data, because the shape to be rendered is specified by discrete points, not a continuous function. (Note the data may have its original definition based on some continuous operation. However, the application specifies the shape rendered using discrete points, e.g., fluid flow, parametric surfaces, or implicit surfaces)

The TSampledSurface3D object provides for these clients by providing a framework allowing the client to manage the data. The object is a C++ object as described above in the introduction to the detailed description. In order to render an image of the client's data, all that is required is the client generate shards. Shards refers to 3D triangles with optional shading information. The term shard is used instead of triangle to describe the basic unit of rendering because a shard's vertices contain additional information besides geometry (color, texture map coordinates, normals, etc.) Using vertices connected with triangles as the basic medium for specifying the shape to be rendered provides a simple common denominator for 3D surface data defined by discrete points.

The discretized data generated by the client is not limited to just geometry, but normals, colors and texture map indices may be supplied at each vertex of a shard. This allows the application to have detailed control over the appearance of the data, and incorporate additional variables besides the basic geometry of the object into the resulting rendered image. Two well known applications for supplying color information at the vertices include finite element models that use color to show strain energy, and 3D scanners that record an object's color as well as its shape.

Figure 2:
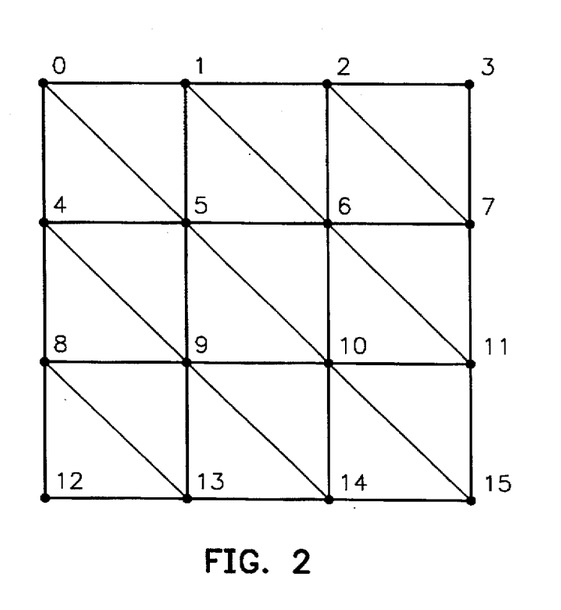
FIG. 2 illustrates shards in accordance with a preferred embodiment.

To increase efficiency, the topology of the shards is decoupled from their vertices. When the discretized data is rendered, the per-vertex information is processed separately from the shards. This is because several shards often share the same vertex. For example, in FIG. 2, the sample grid at point 5 is shared by six shards. Processing the vertices separately from the shards allows the renderer to perform per-vertex operations, such as transforming the points into screen space, only once.

To implement a TSampledSurface3D subclass, a client must provide an iterator to return blocks of vertices. Each vertex defines a 3D point in space, but also may contain other fields, such as color, texture map coordinates, etc. The next routine a subclass must provide generates an iterator that generates the three indices into the array of vertices for the vertices of the shard. So for the mesh shown in FIG. 2, the first call returns an array of sixteen vertices. The iterator object in turn must provide another iterator that generates triples of indices such as (0,5,1), (0,4,5), (1,6,2), (1,5,6), etc., for each of the 18 shards in the diagram above. Note the order is significant, the vertices should be counter-clockwise when viewed from the outside of the surface in modeling space.

Figure 3:
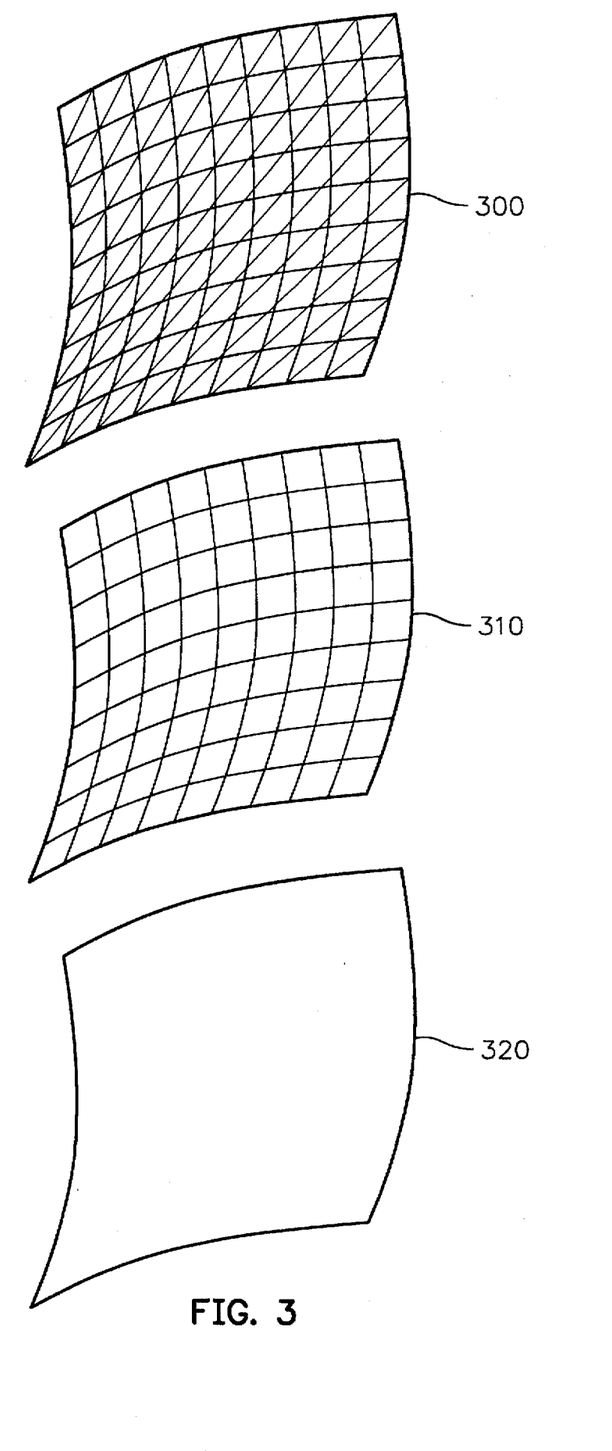
FIG. 3 illustrates various surface renderings in accordance with a preferred embodiment.

Along with the set of indices, a set of flags is returned indicating whether or not an edge of the shard is visible. These flags are examined when the shard is framed. For example, in FIG. 3, the rendering at 300 has all of the shard edges framed. In the rendering at 310, the diagonal edges have been skipped, and at 320, only the edges of the data are drawn. These flags also manage the object to avoid flaming the same edge twice. The subclass does not need to generate all of the vertices at once. This allows the object to alternate between generating vertices and shards during the rendering process. This is useful for data sets that generate points on the fly, and may not want to store the vertices for the entire object at one time. The renderer keeps asking for blocks of vertices and shard iterators until no more are available (i.e., the CopyVertexInfo method returns FALSE to indicate no more shards are available).

CLASS STRUCTURE

The TSampledSurface3D objects implemented in C++ look like this:

```
class TSampledSurface3D {
    virtual TShardChunkIterator* CreateShardChunkIterator() = 0;
    // See section below on streaming
    virtual StreamOutAsShards( TStream& towhere ) const;
}
class TShardChunkIterator {
    // TShadingInfo has point, normal, color, texture coords, etc
    // Returns TRUE if there is more data to fetch; copies data into the data
    parameter
    virtual Boolean CopyVertexInfo(TShadingInfoArray& data) = 0;
    virtual TShardIterator * GetShardIterator() const = 0;
    // Used for optimization, see below
    virtual SetCamera(const TCamera& cam, Boolean cullBackFaces) = 0;
}
```

Figure 4:
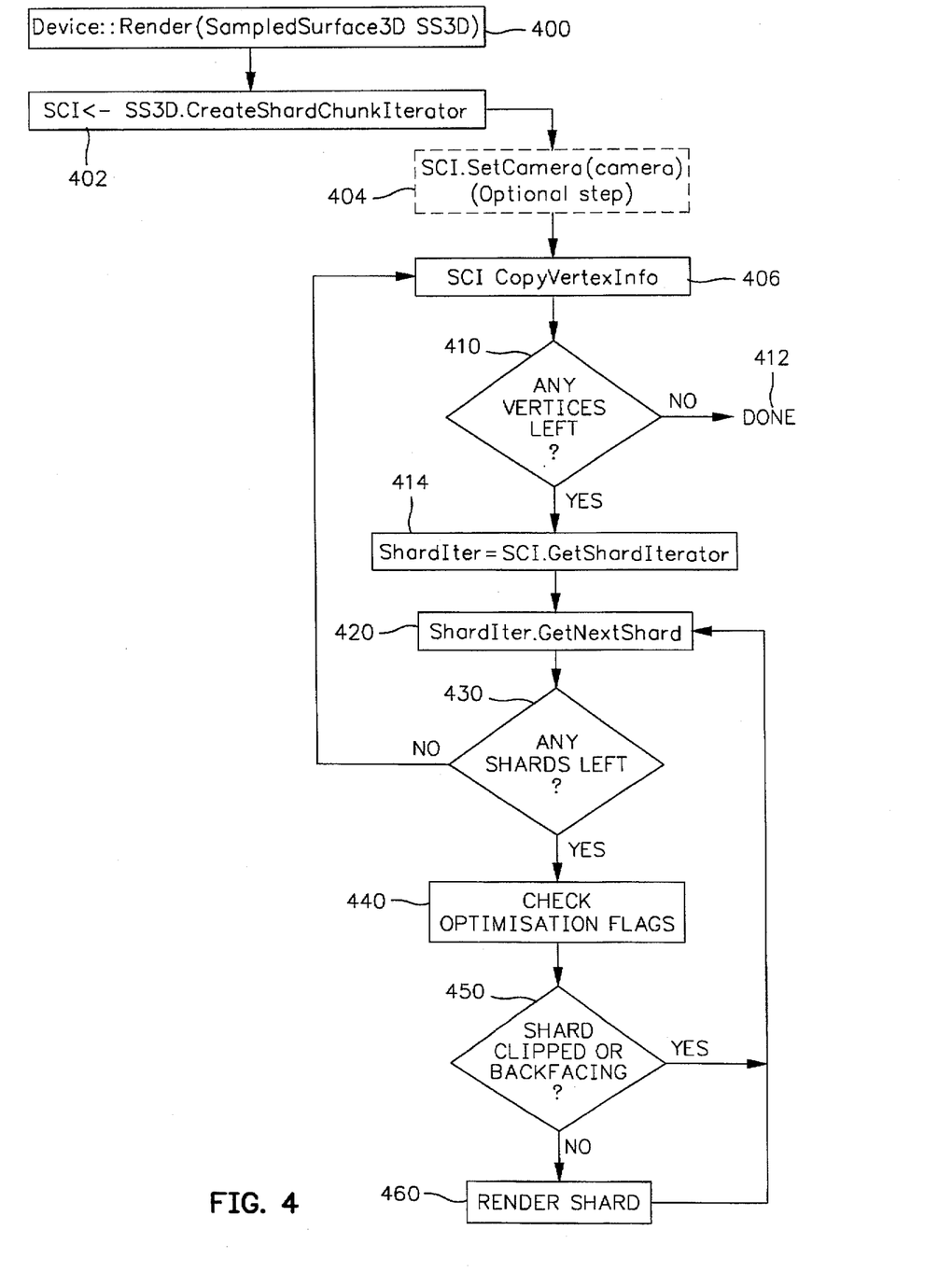
FIG. 4 is a flowchart of the detailed logic in accordance with a preferred embodiment.

FIG. 4 is a flowchart setting forth the detailed logic used for rendering a SampledSurface3D Object in accordance with a preferred embodiment. Processing commences at function block 400 which sets forth the invocation of a rendering operation. Then, to render a discretized surface, the renderer creates a TShardChunkIterator as set forth in function block 402. An optional step is set forth in function block 404 to determine what portions of the object are visible from the viewpoint defined by a camera object. It then calls the iterator's CopyVertexInfo( ), as shown in function block 406, to obtain a copy of the per-vertex information of the surface. A test is performed at decision block 410 to determine if any vertices are left. If not, then processing is complete as indicated at 412. If there are additional vertices to process, then at function block 414, the renderer initializes the data for the particular 3D scene (e.g., transform points to screen space), and then invokes the TShardIterator when it actually draws the object. This process continues in "chunks", as shown in function block 420, each chunk starting with the call to CopyVertexInfo. It ends when CopyVertexInfo returns FALSE, indicating that all of the data has been retrieved from the object as detected at decision block 430. There is no attempt by the renderer to share vertices between chunks, since the number of vertices along a seam between two chunks is small compared to the number in the chunk ($O(\sqrt{n})$). Details of the rendering processing are provided below including an example in FIG. 5.

Figure 5:
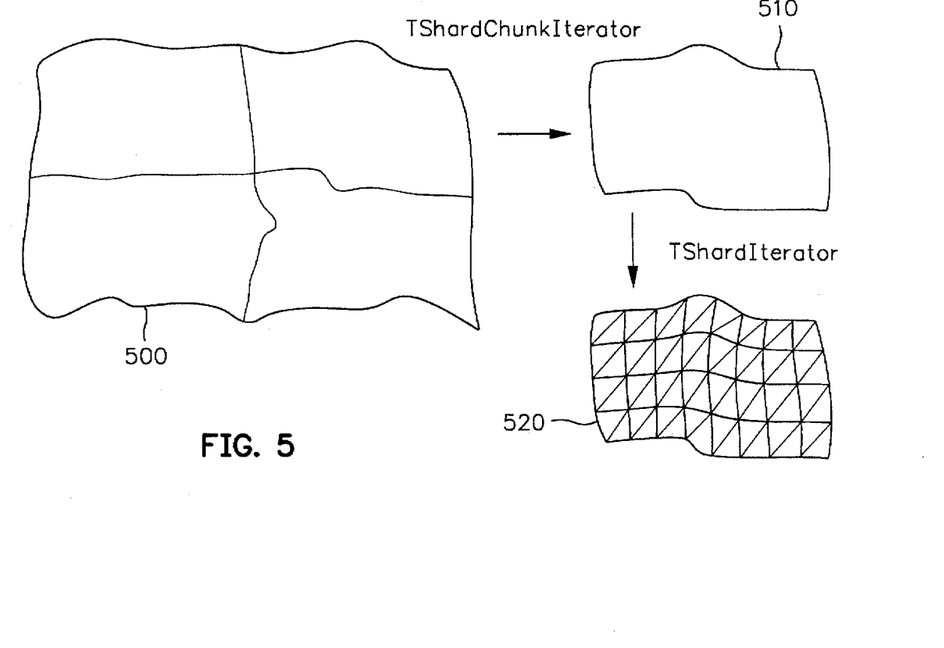
FIG. 5 is a series of surface renderings in accordance with a preferred embodiment.

FIG. 5 is an illustration of a surface 500 that is divided into four "chunks" of area. The TShardChunkIterator is used to render the surface appearing at 510, and the TShardIterator renders the surface appearing at 520. The TShadingInfoArray is an array of objects containing the information in a TShadingInfo (point, normal, color, texture coordinate, tangent, etc.) The TShardIterator is associated with TSampledSurface3D which is used by the renderer as discussed above with reference to function block 414 of FIG. 4. The class structure for the TShardIterator appears below.

```
class TShardIterator {
public:
    enum { kFrontFace, kBackFace, kUnknown } EFrontFaceFlag;
    enum { kClipped, kUnclipped, kUnknown } EClipFlag;
    virtual Boolean GetNextShard( long& i0, long& i1, long& i2,
            Boolean& edge01vis,
            Boolean& edge12vis,
            Boolean& edge20vis);
    // Second version with optional flags for render optimization, see below
    virtual Boolean GetNextShard( long& i0, long& i1, long& i2,
            Boolean& edge01vis,
            Boolean& edge12vis,
            Boolean& edge20vis,
            EFrontFaceFlag frontFlag,
            EClipFlag clipFlag);
};
```

The code for rendering a TSampledSurface object appears below:

```
TGrafDevice::RenderSampledSurface3D( TSampledSurface3D& dd3d )
{
    TShadingInfoArray vertices;
    TShardChunkIterator * dd3Diter = dd3d.CreateShardChunkIterator();
    // The outer loop processes "chunks" of data from the SS3D
    while (dd3Diter->CopyVertexInfo( vertices ) )
    {
        // Take the generic TShadingInfo data, and add device level
information
        TDeviceVertices devVerts = PrepareData( vertices );
        TShardIterator * shardIter = dd3Diter->GetShardIterator();
        while (shardIter->GetNextShard( i0, i1, i2, f0, f1, f2 ))
        {
            RenderShard( devVerts[i0], devVerts[i1], devVerts[i2] );
        }
```

```
        delete shardIter;
    }
    delete dd3Diter;
}
```

The values i0, i1 and i2 are integer indices into the array returned by CopyVertexInfo( ). Note that the TSampledSurface3D object is streamable. Streamable refers to the ability to write the object's contents to a data stream or file in a manner that allows the object to be reconstructed at a later date. If the object is being streamed within the same machine, then the underlying subclass can be used since the library code to extract the data for rendering is available. If a SampledSurface3D object is to be spooled or streamed across a network to a foreign machine that may not have the library defining the subclass, it can be "flattened" by using the TSampledSurface3D's StreamOutAsShards method. A sample implementation for this is provided below.

```
TSampledSurface3D::StreamOutAsShards(TStream& towhere )
{
    TShadingInfoArray vertices;
    TShardChunkIterator * ss3Diter = CreateShardChunkIterator();
    while (ss3Diter.CopyVertexInfo( vertices ))
    {
        TRUE >>= towhere;
        // Flag indicating more data available
            vertices >>= towhere;
        // Stream out the vertices
        TShardIterator * shardIter = ss3Diter.GetShardIterator();
        while (shardIter->GetNextShard( i0, i1, i2, f0, f1, f2 ))
        {
            i0 >>= towhere;
            i1 >>= towhere;
        // Stream out indices into the block of vertices
            i2 >>= towhere;
            f0 >>= towhere;
            f1 >>= towhere;
            f2 >>= towhere;
        }
        -1L >>= towhere;
        // Sentinel indicating no more shards.
        delete shardIter;
    }
    FALSE >>= towhere;
    // Flag no more data available.
    delete ss3Diter;
}
```

A preferred embodiment optionally uses two optimizations to significantly improve performance as set forth in FIG. 4 at function block 440 and 450. The first is ignoring backfacing portions of the surface (if backfacing is on), as shown in function block 440, and the second is ignoring portions of the surface that are clipped off the screen, as shown in function block 450. TSampledSurface3D takes advantage of these optimizations by providing two additional methods for the renderer: SetCamera and a version of the TShardIterator that returns clipping flags. SetCamera utilizes a parameter pointing to a camera object that specifies the 3D view of the object to be displayed. The renderer calls SetCamera before invoking CopyVertexInfo. When the shards are rendered, as set forth in function block 460, the renderer examines the clipping flags returned for each shard to determine if clipping or backface culling tests are necessary. For each shard, two flag values are returned. These flags indicate:

the shard is known to be unclipped (renderer may skip clipping tests)

The shard may or may not be clipped (renderer must test it)

The shard is backfacing (if back face culling is off)

The shard is frontfacing

The shard's orientation is unknown and must be tested

To illustrate these facilities, consider a THeightField3D subclass implementing a 3D height field. The height field is essentially a planar rectangle, with relatively small perturbations in Z from the plane representing the height at each grid point. In the SetCamera call, the THeightField3D object first examines the base plane of the height field. If this plane is backfacing (determined by the camera's IsBackfacing call), and the backfaces are being culled, then the object knows not to bother generating any data (i.e., CopyVertexInfo immediately returns FALSE). Likewise, THeightField3D can call the camera's GetClipCode method on the four corners of the height field plane. If the returned clip codes indicate the entire height field is off screen, then the rendering may be skipped. Likewise, if the clipping and backfacing tests indicate that the entire object is from facing and/or unclipped, then the renderer can skip these checks on the individual shards.

These optimizations can also be made on portions of the set of discretized data rendered. For example, the THeightField3D may render the data in nine chunks (i.e., nine separate calls to CopyVertexInfo before it returns FALSE). Each of these individual chunks can perform the backfacing and clipping tests. Thus if a corner happens to be completely clipped away it is simply skipped.

EXAMPLE DATA FROM A 3D DIGITIZER

Figure 6:
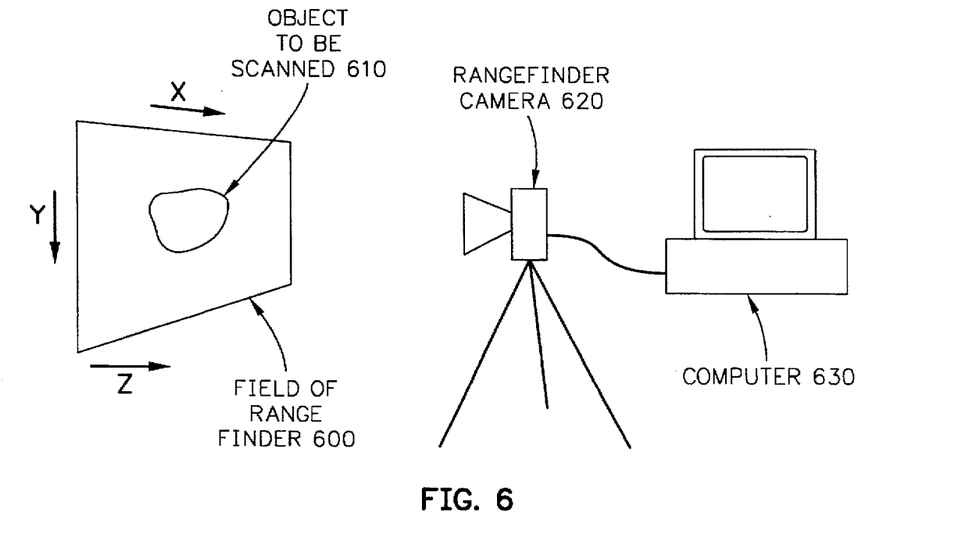
FIG. 6 illustrates a system for acquiring data from a 3D digitizer in accordance with a preferred embodiment.
Figure 7:
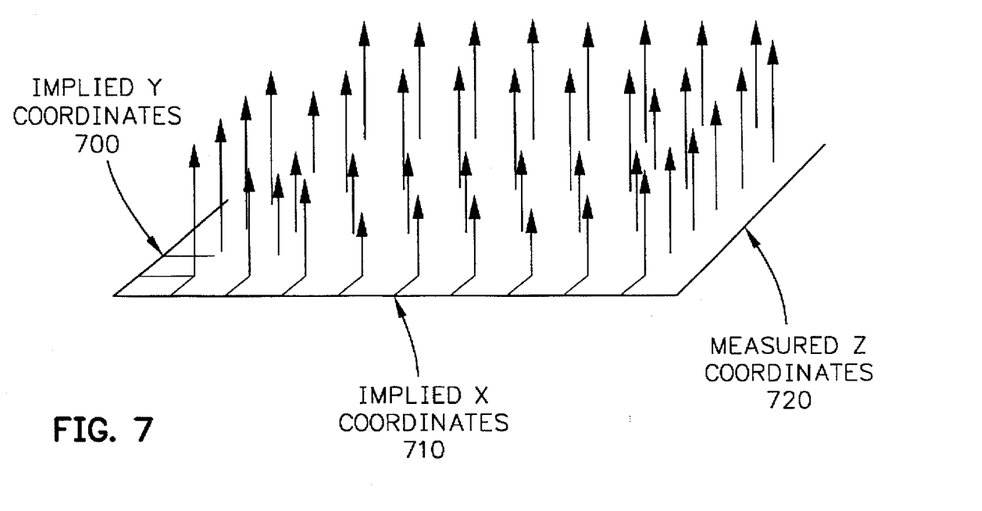
FIG. 7 illustrates measured Z coordinates and implied X & Y coordinates in accordance with a preferred embodiment.

Assume the data from a 3D range-finder type digitizer is stored as an array of 1000×1000 depth values. These data points will be used as the Z coordinates for the surface rendered. An example of a rangefinder system is set forth in FIG. 6. The field of the range finder 600 is already known, so the field is divided into 1000×1000 equal steps. The object to be scanned is presented at 610, the rangefinder camera is presented at 620 and the computer for storing the rendered data is shown at 630. The computer 630 corresponds to a FIG. 1 computer. FIG. 7 illustrates the rangefinder data as it is received from the camera. The only data from the range finder are the Z coordinates 720, the X 700 and Y 710 coordinates are implied as the system steps through the matrix of 1000×1000 data points.

Since 1,000,000 is a large number of data points, this data is utilized in 10 smaller units referred to as chunks. Rendering this surface using the rendering system presented as a preferred embodiment above requires implementing the following routines. The first is TShardChunkIterator::CopyVertexInfo( ). This routine will get the first 10,000 data points from the scanner, and supply the X and Y coordinates. The code for processing the information as it is received from the camera is presented below.

```
Boolean
TShardChunkIterator::CopyVertexInfo( TShadingInfoArray& data )
{
    // fRawData is a 1,000,000 element array with the 1Kx1K
    // collection of data from the scanner. fChunkCount keeps track of
    // how many times CopyVertexInfo has been called.
    if (fChunkCount == 10)
        return FALSE; // All data has been copied out
    for (i = 0; i < 100; i++) // 100 rows in this chunk
    for (j = 0; j < 1000; j++) // 1000 items per row
    {
        data[i * 1000 + j] = kDefault; // Set default color, etc.
```

-continued

```
        TGPoint3D * p = &data[i * 1000 + j].fPoint;
        p->fx = j; // Generate implied X and Y
        p->fy = fChunkCount * 1000 + i
        p->fZ = fRawData[(fChunkCount * 1000 + i)*1000 + j];
    }
    fChunkCount++;
    return TRUE;
}
```

Figure 8:
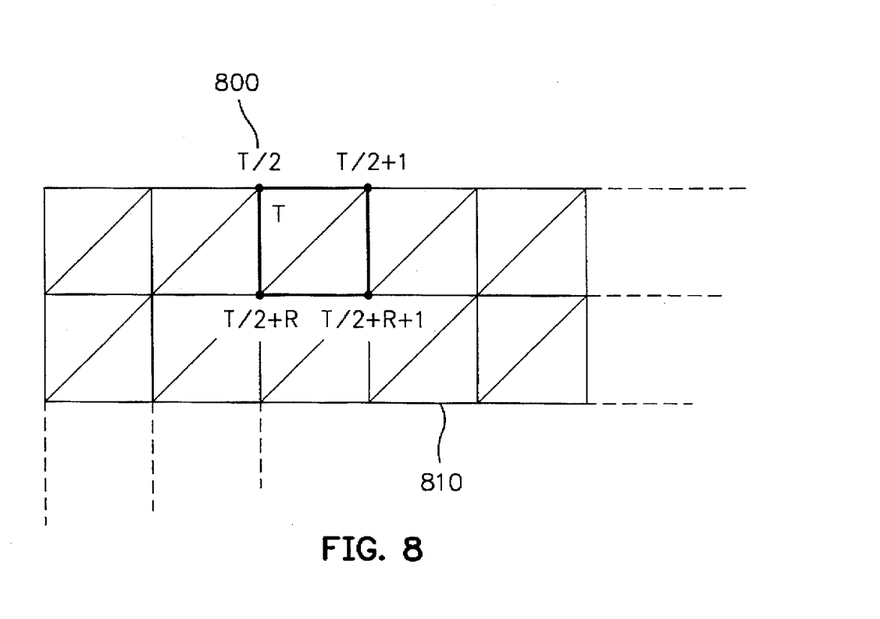
FIG. 8 presents the layout of shards from a regularly spaced grid in accordance with a preferred embodiment.

Note that with this raw data for the vertices, the rendering system will compute normals and shading values once per vertex (thus eliminating the computational load of doing it redundantly for every triangle rendered. FIG. 8 presents the layout of shards from a regularly spaced grid in accordance with a preferred embodiment. At 800, T=the triangle number, and at 810, R=the number of samples per row.

The next step is to create a shard iterator to generate the triangles for rendering the surface from the scanner data as shown in function block 414 of FIG. 4. This processing generates indices into the vertex information that CopyVertexInfo generated; i.e., only the topology for how to hook the triangles up is required. This is done via a numbering scheme set forth at 800 and 810 in FIG. 8. An implementation for the method GetNextShard is presented below.

```
TShardIterator::GetNextShard( long& i0, long& i1, long& i2,
        Boolean& edge01vis,
        Boolean& edge12vis,
        Boolean& edge20vis)
{
    // fShardNumber is the number of the shard we've generated.
    if (fShardNumber == 1000 * 100)
        return FALSE; // All shard for this chunk generated
    if (even( fShardNumber ))
    {
        i0 = fShardNumber / 2;
        i1 = fShardNumber / 2 + 1000;
        i2 = fShardNumber / 2 + 1;
        // Show edge visibility, diagonal edges are not visible.
        edge01vis = TRUE; edge12vis = FALSE; edge20vis = TRUE;
    }
    else // odd # shard
    {
        i0 = fShardNumber / 2 + 1;
        i1 = fShardNumber / 2 + 1000;
        i2 = fShardNumber / 2 + 1000 +1;
        // Show edge visibility, diagonal edges are not visible.
        edge01vis = FALSE; edge12vis = TRUE; edge20vis = TRUE;
    }
    fShardNumber++;
    return TRUE;
}
```

EXAMPLE DATA FROM A FINITE ELEMENT MESH RENDERING

Figure 9:
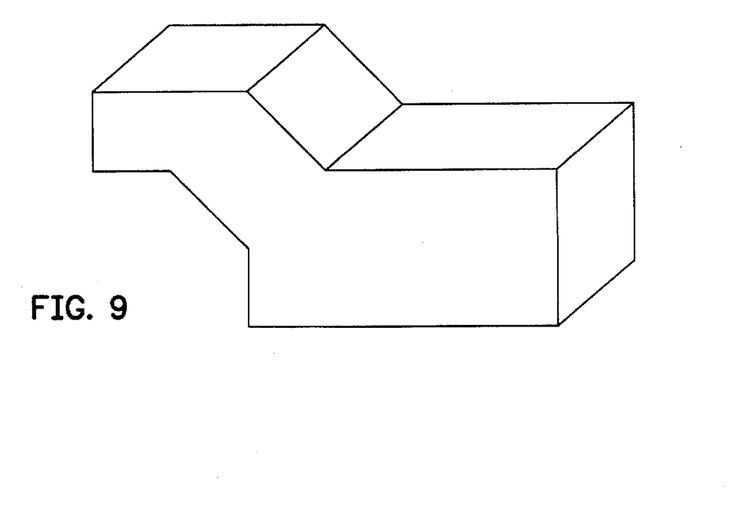
FIG. 9 illustrates a brace to be analyzed as a finite element model in accordance with a preferred embodiment.
Figure 10:
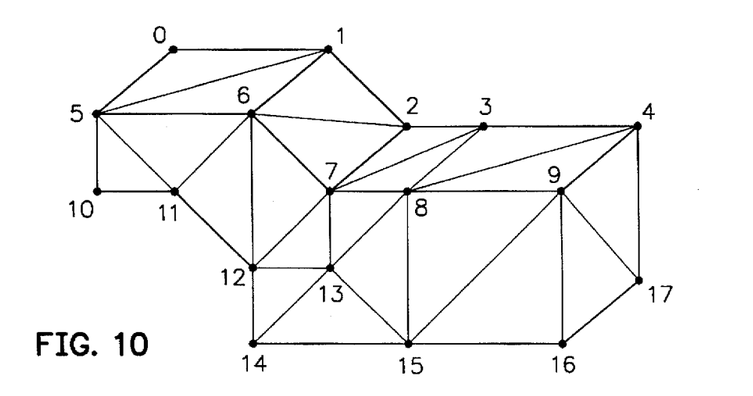
FIG. 10 illustrates a meshed model in accordance with a preferred embodiment.

A Finite Element Model (FEM) is created by 3D modeling software. Usually a part is designed to meet particular shape requirements, and then "meshed," or broken into shards by the FEM software. At the vertices of the shards, the FEM software calculates the amount of strain energy on the vertices. These strain energy estimations are usually converted into color gradients to give a graphical display of the strain on the part. FIG. 9 illustrates a brace to be analyzed by the FEM method. FIG. 10 illustrates the meshed model generated by the FEM software.

In addition to X, Y, Z geometric position information, each of the numbered vertices above also has a value representing the strain energy at that point.

The model generated by the FEM software may be stored as a list of vertices (such as those numbered above), and a list of triangular shards formed by those vertices, e.g. (0,5,1), (1,5,6), (5,10,11), (1,6,2), etc., where the numbers in parenthesis refer to the indices of the vertices.

To render this model using the SampledSurface3D framework discussed above, the CopyVertexInfo routine is defined as follows (it assumes that the FEM data has been loaded elsewhere).

```
Boolean
TShardChunkIterator::CopyVertexInfo( TShadingInfoArray& data )
{
    for (i = 0; i < NumberFEMVertices;i++)
    {
        data[i].fPoint.fX = FEMdataXCoordinate[i];
        data[i].fPoint.fY = FEMdataYCoordinate[i];
        data[i].fpoint.fZ = FEMdataZCoordinate[i];
        // Set the color according to the strain energy at the
        // vertex. Energy to Color performs some user-defined
        // mapping, perhaps via a lookup table.
        data.fBaseColor[i] = EnergyToColor( FEMdataStrain[i]);
    }
    // This assumes all data is processed in one step. For large data sets,
    // this can be broken into multiple calls, like example #1.
    return FALSE;
}
```

The ShardIterator is also fairly simple, as it just returns the data generated by the FEM program:

```
TShardIterator::GetNextShard( long& i0, long& i1, long& i2,
        Boolean& edge01vis,
        Boolean& edge12vis,
        Boolean& edge20vis)
{
    if (fNumberOfShards > FEMdataNumberOfShards)
        return FALSE; // All shards rendered
    i0 = FEMdataV0index[fNumberOfShards];
    i1 = FEMdataV1index[fNumberOfShards];
    i2 = FEMdataV2index[fNumberOfShards];
    // Edge visibility may or may not be useful
    edge01vis = FALSE; edge12vis = FALSE; edge20vis = FALSE;
    fNumberOfShards++;
    return TRUE;
}
```

Figure 11:
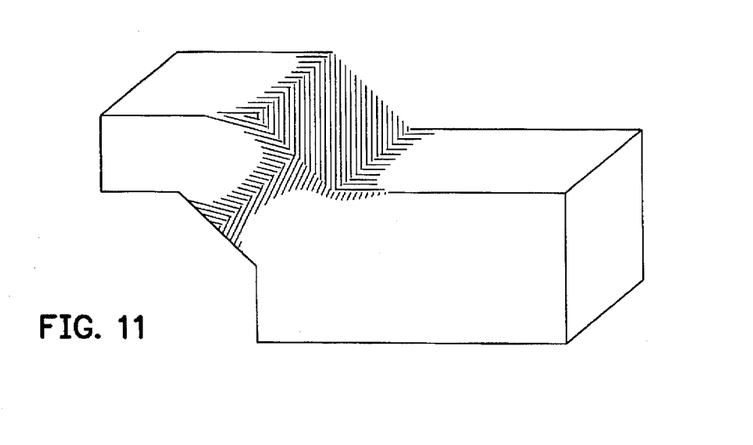
FIG. 11 illustrates a surface rendering ultilizing the color representative of the strain energy in accordance with a preferred embodiment.

As the shards are rendered, the rendering program can use the color generated by the strain energy to produce a smooth shaded diagram of the strain distribution on the part, such as the one illustrated in FIG. 11. Strain energy is not the only variable that may be displayed in this fashion; others such as temperature distribution may be displayed in a similar fashion. This technique is commonly used in datasets generated by "scientific visualization" applications.

Similar uses of the rendering system are available for fractal surface generation, implicit surface sampling, and parametric surface rendering. Further, while the invention has been described in terms of a preferred embodiment in a specific system environment, those skilled in the art will recognize that the invention can be practiced, with modification, in other and different hardware and software environments within the spirit and scope of the appended claims.

Having thus described our invention, what we claim as new, and desire to secure by Letters Patent is:

1. In a computer having a memory and a 2D display, a system for rendering on the display an image of a 3D surface, the image being defined by point data stored in the memory, the system comprising:

(a) subclassable surface object class information, stored in the memory and having segment data logic for generating vertices data from stored point data and for storing the vertices data in the memory, and shard iteration logic for generating a plurality of indices into the stored vertices data, the plurality of indices selecting three vertices defining a shard;

(b) surface object means for constructing a plurality of 3D surface objects from the surface object class information, each surface object corresponding to a chunk of the 3D surface image, each chunk defined by a plurality of shards, wherein each surface object includes means for invoking shard iteration logic peculiar to the surface object class from which it was constructed; and (c) a rendering object, stored in the memory and having first means for iterating over the surface objects to select one surface object corresponding to a chunk to be rendered, the first means including means for generating a block of vertices data corresponding to the selected surface object, second means for generating 2D display data from the vertices data, third means for invoking the shard iteration logic to retrieve indices defining the plurality of shards for the selected surface image chunk, and fourth means for rendering the shards defining the chunk on the display using the 2D display data and the retrieved shard indices.

2. The system of claim 1 wherein the segment data logic includes a segment iterator object having a member function for sequentially generating vertices data representing points on a target surface segment from stored point data, and wherein the shard iteration logic includes a shard iterator object having a member function that generates indices into the stored vertices data defining a plurality of shards which form the target image segment.

3. The system of claim 2 wherein the second means includes means for transforming the stored vertices data into the 2D display data, and wherein the fourth means uses the retrieved shard indices to retrieve the stored transformed vertices data and provide it to the rendering means.

4. The system of claim 1 wherein the vertices data includes at least one of the group consisting of:

normal and shading values for each vertex;

color information for each vertex;

texture map information for each vertex; and shading information for each vertex.

5. The system of claim 1 wherein the shard iteration logic includes means for generating visibility flag information indicating when an edge of one of the shards is visible; and wherein the rendering means includes means responsive to the visibility flag information for rendering the edge.

6. The system of claim 5 further including means for providing clipping information to the shard iteration logic and wherein the visibility flag information generating means is responsive to the clipping information for generating the visibility flag information.

7. The system of claim 6 wherein the system further includes means for providing backfacing information to the shard iteration logic and wherein the visibility flag information generating means is responsive to the backfacing information for generating the visibility flag information.

8. In a computer having a memory and a 2D display, a method for rendering on the display an image of a 3D surface, the image being comprised of an image surface segment defined by point data stored in the memory, the method comprising the steps of:

(a) storing in the memory subclassable surface object class information having segment data logic for generating vertices data from stored point data and for storing the vertices data in the memory, and shard iteration logic for generating a plurality of indices into the stored vertices data, the plurality of indices selecting three vertices defining a shard;

(b) constructing a plurality of 3D surface objects from the surface object class information, each surface object corresponding to a chunk of the 3D surface image, each chunk defined by a plurality of shards, wherein each surface object includes means for invoking shard iteration logic peculiar to the surface object class from which it was constructed;

(c) constructing a rendering object in the memory;

(d) using the rendering object to select one surface object corresponding to a chunk to be rendered and to invoke the 3D surface object to generate and store vertices data corresponding to the selected surface object;

(e) using the rendering object to generate 2D display data from the vertices data;

(f) using the rendering object to invoke the shard iteration logic to retrieve indices defining the plurality of shards for the selected surface image chunk; and (g) using the rendering object to render the shards defining the chunk on the display using the 2D display data and the retrieved shard indices.

9. The method of claim 8 wherein the segment data logic includes a segment iterator object having a member function for sequentially generating vertices data representing points on a target surface segment from stored point data, and wherein the shard iteration logic includes a shard iterator object having a member function that generates indices into the stored vertices data defining a plurality of shards which form the target image segment.

10. The method of claim 9 wherein step (e) comprises the steps of:

(e1) transforming the stored vertices data into the 2D display data, and wherein step (g) comprises the steps of:

(g1) using the retrieved shard indices to retrieve the stored transformed vertices data.

11. The method of claim 8 wherein the vertices data includes at least one of the group consisting of:

normal and shading values for each vertex;

color information for each vertex;

texture map information for each vertex; and shading information for each vertex.

12. The method of claim 8 wherein the shard iteration logic includes logic for generating visibility flag information indicating when an edge of one of the shards is visible; and wherein step (g) comprises the step of:

(g1) using the visibility flag information to render the edge.

13. The method of claim 12 further including the step of:

(h) providing clipping information to the shard iteration means and wherein the visibility flag information generating means is responsive to the clipping information for generating the visibility flag information.

14. The method of claim 12 further including the step of:

(l) providing backfacing information to the shard iteration means and wherein the visibility flag information generating means is responsive to the backfacing information for generating the visibility flag information.

15. A computer program product for use in a computer having a memory and a 2D display, a system for rendering on the display an image of a 3D surface, the image being defined by point data stored in the memory, the computer program product comprising a computer usable medium having computer readable program code thereon including:

(a) surface object class code having segment data logic for generating vertices data from stored point data and for storing the vertices data in the memory, and shard iteration logic for generating a plurality of indices into the stored vertices data, the plurality of indices selecting three vertices defining a shard;

(b) program code for constructing a plurality of 3D surface objects in the memory from the surface object class information, each surface object corresponding to a chunk of the 3D surface image, each chunk defined by a plurality of shards, wherein each surface object includes program code for invoking shard iteration logic peculiar to the surface object class from which it was constructed; and (c) program code for instantiating a rendering object in the memory, the rendering object having program code for iterating over the surface objects to select one surface object corresponding to a chunk to be rendered, the iterating program code including program code for generating a block of vertices data corresponding to the selected surface object, program code for generating 2D display data from the vertices data, program code for invoking the shard iteration logic to retrieve indices defining the plurality of shards for the selected surface image chunk, and program code for rendering the shards defining the chunk on the display using the 2D display data and the retrieved shard indices.

16. The computer program product of claim 15 wherein the segment data logic includes a segment iterator object having a member function for sequentially generating vertices data representing points on a target surface segment from stored point data, and wherein the shard iteration logic includes a shard iterator object having a member function that generates indices into the stored vertices data defining a plurality of shards which form the target image segment.

17. The computer program product of claim 16 wherein the program code for generating 2D display data includes program code for transforming the stored vertices data into the 2D display data, and wherein the program code for rendering the shards uses the retrieved shard indices to retrieve the stored transformed vertices data and provide it to the rendering program code.

18. The computer program product of claim 15 wherein the vertices data includes at least one of the group consisting of:

normal and shading values for each vertex;

color information for each vertex;

texture map information for each vertex; and shading information for each vertex.

19. The computer program product of claim 15 wherein the shard iteration logic includes program code for generating visibility flag information indicating when an edge of one of the shards is visible; and wherein the program code for rendering the shards includes program code responsive to the visibility flag information for rendering the edge.

20. The computer program product of claim 19 further including program code for providing clipping information to the shard iteration logic and wherein the visibility flag information generating program code is responsive to the clipping information for generating the visibility flag information.

21. The computer program product of claim 20 further including program code for providing backfacing information to the shard iteration logic and wherein the visibility flag information generating program code is responsive to the backfacing information for generating the visibility flag information.

* * * * *